United States Patent [19]

Inaba et al.

[11] 4,422,142

[45] Dec. 20, 1983

[54] SYSTEM FOR CONTROLLING A PLURALITY OF MICROPROCESSORS

[75] Inventors: Hajimu Inaba; Hideo Miyashita, both of Hino; Shoichi Otsuka, Koganei, all of Japan

[73] Assignee: Fujitsu Fanuc Limited, Tokyo, Japan

[21] Appl. No.: 160,155

[22] Filed: Jun. 17, 1980

[30] Foreign Application Priority Data

Jun. 22, 1979 [JP] Japan .................................. 54-78007

[51] Int. Cl.³ .......................... G06F 13/00; G06F 9/46
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,676,860 | 7/1972 | Collier et al. | 364/200 |
| 3,940,743 | 2/1976 | Fitzgerald | 364/200 |
| 4,007,450 | 2/1977 | Haibt et al. | 364/200 |
| 4,041,472 | 8/1977 | Shah et al. | 364/900 |
| 4,096,571 | 6/1978 | Vander Mey | 364/200 |
| 4,237,534 | 12/1980 | Felix | 364/200 |
| 4,263,649 | 4/1981 | Lapp, Jr. | 364/200 |
| 4,272,819 | 6/1981 | Katsumata et al. | 364/200 |
| 4,281,381 | 7/1981 | Ahuja et al. | 364/200 |
| 4,318,174 | 3/1982 | Suzuki et al. | 364/200 |
| 4,342,079 | 7/1982 | Stewart et al. | 364/200 |

OTHER PUBLICATIONS

*Intel Component Data Catalog*, pp. 7-80 to 7-90, 1980.
*M6800 Microprocessor Applications Manual*, Motorola Semiconductor Products, Inc., 1975, pp. 1-1 to 1-9.

*Primary Examiner*—Mark E. Nusbaum
*Assistant Examiner*—Gary V. Harkcom
*Attorney, Agent, or Firm*—Armstrong, Nikaido, Marmelstein & Kubovcik

[57] ABSTRACT

A system for controlling a plurality of microprocessors, comprising a common memory which can be selectively switched to exclusive buses which are connected to the plurality of microprocessors, respectively, and a priority control circuit which determines the priority of the address of the microprocessors.

A system for controlling a plurality of microprocessors, comprising a common memory which can be selectively switched to exclusive buses which are connected to the plurality of microprocessors, respectively, and a priority control circuit which determines the priority of the microprocessors. According to the system of the present invention, it has a common memory that is selectively connected to the buses, data is transmitted without affecting the operation of the microprocessors on the receiving side, data transfer between the microprocessors having different cycle times is carried out at speeds that are adapted to the cycle times of the individual microprocessors, and the degree of the exclusive use of the bus by the microprocessor is prevented from being reduced when the direct memory access transfer is carried out. Consequently, a system for controlling a plurality of microprocessors having an improved performance is obtained in accordance with the present invention.

1 Claim, 2 Drawing Figures

SYSTEM FOR CONTROLLING A PLURALITY OF MICROPROCESSORS

BACKGROUND OF THE INVENTION

The present invention relates to a system for controlling a plurality of microprocessors which are employed in computerized controls of industrial machinery and facilities.

In general, data is transferred at relatively high speeds among a plurality of microprocessors by connecting data buses. However, when a direct memory access transfer (DMA transfer) is effected, it is necessary to cut off the microprocessor of a slave side. However, such an interruption of operation due to the cutting-off of the microprocessor is disadvantageous because the processing ability of the entire control system is reduced.

FIG. 1 illustrates a prior art system for controlling a plurality of microprocessors. A plurality of microprocessors 1 and 2 are connected to buses 3 and 4, respectively. It is assumed that the microprocessor 1 serves as the master and the microprocessor 2 as the slave. When it is desired to transfer information from a memory 22 on the side of the bus 3 to a memory 25 on the side of the bus 4 in the direct memory access (DMA) transfer mode, information stored in the memory 22 must be transferred to the memory 25 through a connecting bus 30 and a path "a". In this case, a portion of the bus 4 is occupied as the path "a" for transferring information, and the operation of the microprocessor 2 of the slave side is restricted. Namely, transmissions of information between a program storing unit 24 and an input/output unit 26 through the bus 4 are prevented. FIG. 2 shows these elements and their counterparts, comprising: (a) Program Memory 21, which is the counterpart for the storing unit 24 that is shown in FIG. 2 as Program Memory 24 and described on page 1 as storing unit 24; (b) I/O Device 23, whose counterpart is shown in FIG. 2 as I/O device 26 and whose counterpart is described on page 1 as input/output device 26. Therefore, the bus 4 must be disconnected from the microprocessor 2 at a connection point 41. Consequently, such a prior art system is disadvantageous, because the degree of the exclusive use of the bus 4 by the microprocessor 2 is reduced and, accordingly, the processing ability of the entire control system is reduced.

SUMMARY OF THE INVENTION

In view of the above-mentioned problems inherent in the prior art system, the main object of the present invention is to provide a control system which is based upon a principle in which a common memory is selectively connected to the buses, so that the data can be transferred without affecting the operation of the microprocessors on the receiving side, so that the data can be transferred among the microprocessors having different cycle times at speeds that are adapted to the cycle times of the individual microprocessors, and so that direct memory access transfer can be carried out without causing the degree of the exclusive use of the bus by the microprocessor to be reduced.

According to the present invention, therefore, there is provided a system for controlling a plurality of microprocessors, comprising a plurality of microprocessors, a plurality of exclusive buses connected to said plurality of microprocessors, respectively, and at least a connecting bus between said exclusive buses, each of said microprocessors being capable of operating independently, characterized in that said system further comprises a common memory which can be selectively connected to said exclusive buses, and a priority control circuit which determines the priority of the address of said microprocessors, whereby priority control of said microprocessors is effected.

DESCRIPTION OF THE PREFERRED EMBODIMENT

Figure 1:
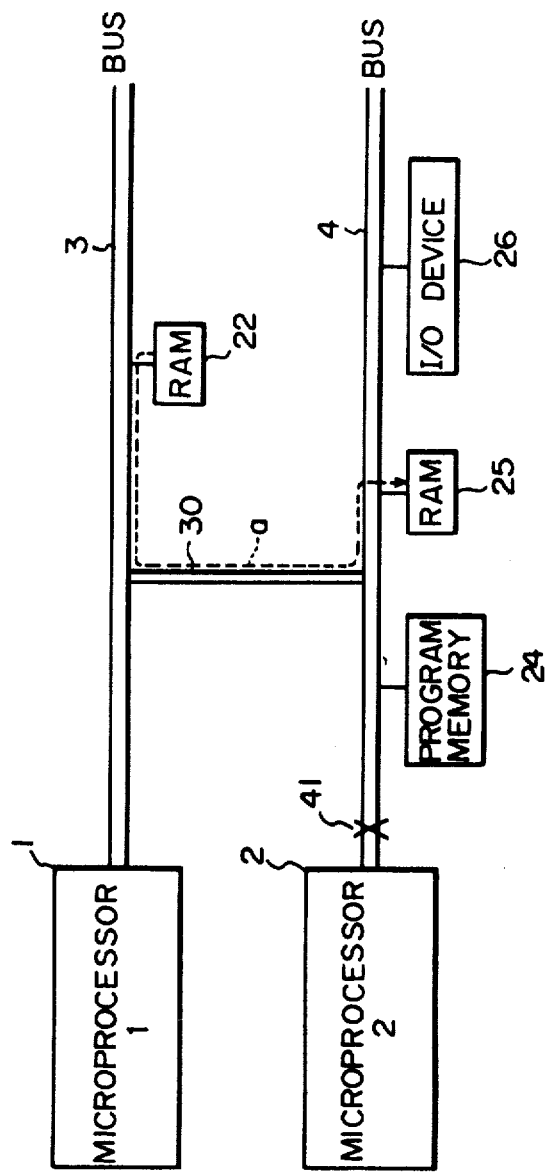
FIG. 1 is a diagram of a prior art system for controlling a plurality of microprocessors.
Figure 2:
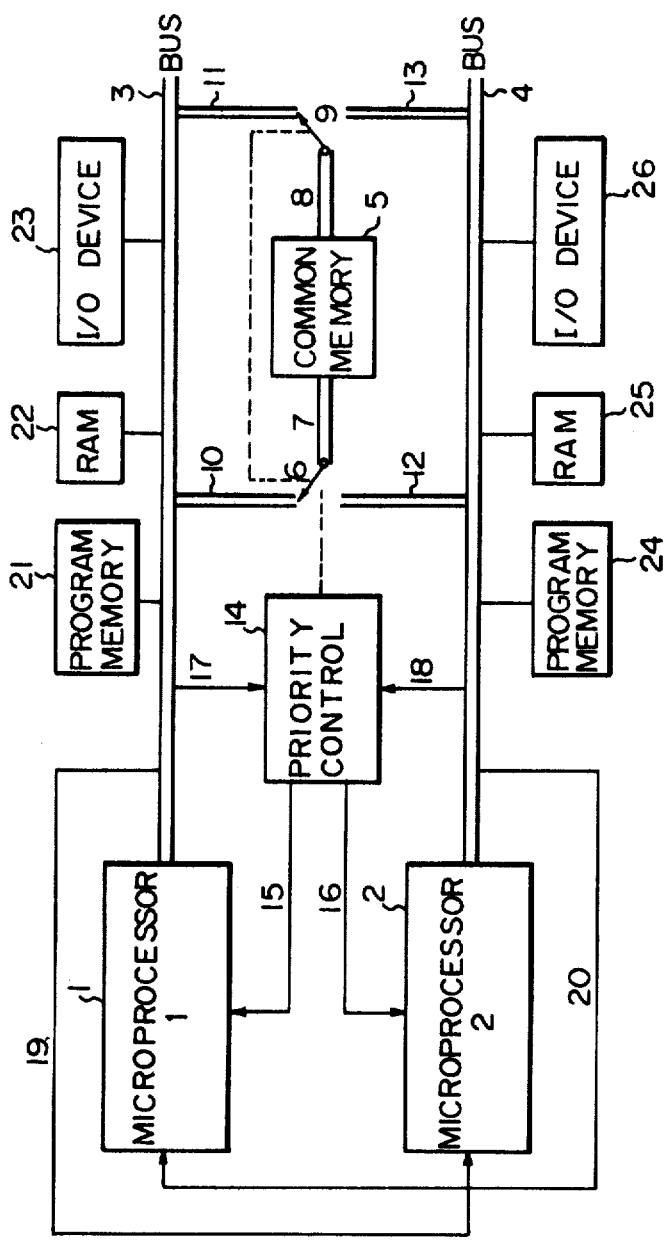
FIG. 2 is a diagram of a system for controlling a plurality of microprocessors according to an embodiment of the present invention.

In FIG. 2, microprocessors 1 and 2 are connected to exclusive buses 3 and 4, respectively. When data is to be transferred between the microprocessors 1 and 2, the data of the microprocessor 1 on the sending side is stored in a common memory 5, and an interruption circuit requests the microprocessor 2 on the receiving side to receive the data. To store the data of the microprocessor 1 in the common memory 5, switches 6 and 9 are connected to bus branches 10 and 11, forming extensions 7 and 8 and address signals are received through the bus branch 10 and the data is received through the bus branch 11. Upon receipt of a request for interruption of the reception of data, microprocessor 2 on the receiving side transfers the contents of the common memory to an exclusive memory 25 on the receiving side. To transfer the contents of the common memory to the exclusive memory 25 on the receiving side through extensions 7 and 8, the switches 6 and 9 are connected to bus branches 12 and 13, address signals are received through the bus branch 12 and the data is transferred to the exclusive memory 25 on the receiving side through the bus branch 13. The processor 2 need not transfer the contents of the common memory to the exclusive memory on the receiving side but can access directly the contents of the common memory to process the data. To report the executed results, the results of the execution are stored in the common memory and a request for receiving the data is generated by the interruption circuit in the direction opposite to the above-mentioned case.

When the microprocessors 1 and 2 simultaneously access the common memory, a priority control circuit 14 determines the priority for the microprocessors 1 and 2 to use the common memory circuit. The priority control circuit 14 operates to determine priority of the microprocessors so that the microprocessor which accesses earlier the common memory obtains the priority and the microprocessor which accesses later the common memory is maintained in the waiting state until the microprocessor obtaining the priority completes the operation. Thus, the common memory is used in a time divisional manner. Since the degree of exclusive use of the bus by the microprocessor which accesses later is reduced when the common memory are accessed simultaneously by the microprocessors 1 and 2, interruption circuits 19 and 20 are provided so that the microprocessors can exchange the information with each other that the microprocessors are ready to access the common memory, in order to prevent an occurrence of simultaneous access to the common memory. The priority control circuit 14 receives address selection signals 17 and 18 from the buses 3 and 4 with respect to the instructions for reading-out and writing-in of the data. The priority control circuit 14 further sends wait signals 15 and 16 to the microcompressors 1 and 2.

Accordingly, the system of the present invention has the advantages of a common memory that is selectively connected to the buses, data is transmitted without affecting the operation of the microprocessors on the receiving side, data transfer between the microprocessors having different cycle times is carried out at speeds that are adapted to the cycle times of the individual microprocessors, and the degree of the exclusive use of the bus by the microprocessor is prevented from being reduced when the direct memory access transfer is carried out. Consequently, a system for controlling a plurality of microprocessors having an improved performance is obtained in accordance with the present invention.

What is claimed is:

1. A system for controlling a plurality of microprocessors comprising:

a first and second microprocessor;

a first and second bus connected to said first and second microprocessors, respectively;

input and output devices connected to said first and second buses, respectively;

exclusive memories connected to said first and second buses, respectively;

at least one program memory connected to one of said first and second buses;

a common memory provided commonly for said first and second microprocessors;

address bus branches branched from said first and second buses for transmitting address signals to said common memory;

data bus branches branched from said first and second buses for transmitting data to said common memory;

switching means provided between said common memory and said bus branches, said switching means being adapted for selectively connecting said common memory through said bus branches to either said first or second bus; and a priority control means for controlling priority of access of said first and second microprocessors to said common memory, the input of said priority control means being connected to said first and second buses for receiving address selection signals, and the output thereof being connected to said first and second microprocessors for sending a wait signal thereto, said priority control means further providing a switch actuating output applied to said switches for switching said switches to determine the priority of access to said common memory between said first and second microprocessors on the basis of the received address selection signals;

at least two interruption circuits, one being connected between said first bus and an input terminal of said second microprocessor, and the other being connected between said second bus and an input terminal of said first microprocessor, said interruption circuits providing information from one of the microprocessors to the other of the microprocessors that the microprocessors are ready to access said common memory, thereby preventing simultaneous access to said common memory;

whereby the microprocessor which first accesses said common memory obtains the priority and the microprocessor which later accesses said common memory is maintained in the waiting state until the microprocessor obtaining the priority completes the operation.

* * * * *